United States Patent Office 3,773,954
Patented Nov. 20, 1973

3,773,954
HYDROXYPHENYL - 2 - DECAHYDROQUINOLYL-CARBINOLS IN PRODUCING β-ADRENERGIC STIMULANT ACTIVITY
Carl Kaiser, Haddon Heights, N.J., assignor to Smithkline Corporation, Philadelphia, Pa.
No Drawing. Original application Nov. 23, 1970, Ser. No. 92,161, now Patent No. 3,691,172. Divided and this application Apr. 10, 1972, Ser. No. 242,865
Int. Cl. A61k 27/00
U.S. Cl. 424—258                    2 Claims

ABSTRACT OF THE DISCLOSURE

Hydroxyphenyl - 2 - decahydroquinolylcarbinols prepared by the condensation of an appropriately substituted ether derivative of a hydroxybenzaldehyde with 2-quinolyl lithium followed by removal of the ether group/s and reduction have β-adrenergic stimulant activity. Erythro and threo diastereo-isomers may be conveniently separated.

---

This is a division of application Ser. No. 92,161, filed Nov. 23, 1970, which has issued into U.S. Pat. No. 3,691,172.

This invention relates to novel hydroxyphenyl-2-decahydroquinolylcarbinols which have useful pharmacodynamic activity. More specifically the compounds of this invention have utility as β-adrenergic stimulants with relatively greater activity on respiratory smooth muscle than on cardiac muscle. Therefore these compounds have direct bronchodilator action with minimal cardiac stimulation as demonstrated in standard pharmacological test procedures.

Two in vitro test systems used for determining selective β-stimulant activity are: (1) effect on spontaneous tone of guinea pig tracheal chain preparations as a measure of β-stimulant (direct relaxant) effect on airway smooth muscle, and (2) effect on rate of spontaneously beating right atria of the guinea pig as a measure of β-stimulant effect on cardiac muscle. The compounds of this invention have selective bronchodilating properties since they are active in (1) above at a dose lower than is required in (2) above resulting in a positive separation ratio.

The compounds of this invention are represented by the following general structural formula:

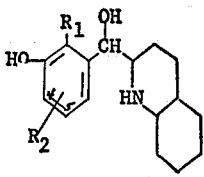

FORMULA I in which:

$R_1$ represents hydrogen, methyl or chlorine and
$R_2$ represents hydroxy in the 4 or 5 position.

Advantageous compounds of Formula I are those wherein $R_1$ is hydrogen and $R_2$ is hydroxy in the 4 or 5 position.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicylic, methanesulfonic, ethanedisulfonic, acetic, oxalic, propionic, tartaric, salicylic, citric, gluconic, lactic, malic, mandelic, cinnamic, citraconic, aspartic, stearic, palmitic, itaconic glycolic, p-aminobenzoic, glutamic, benzenesulfonic, hydrochloric, hydrobromic, sulfuric, cyclohexyl sulfamic, phosphoric and nitric acids.

Further the compounds of this invention may be present as diastereoisomers and are designated as erythro- and threo-isomers which may be resolved as d, l optical isomers. Due to the presence of the decahydroquinoline ring, the compounds may also exist as cis and trans isomers. Unless otherwise specified in the description and accompanying claims, it is intended to include all isomers, whether separated or mixtures thereof.

A preferred compound of this invention is erythro-3,4 - dihydroxyphenyl-2-decahydroquinolycarbinol which relaxes the spontaneous tone of guinea pig tracheal ring preparation at an $ED_{50}$ of 0.28 mcg./ml. while increasing the rate of contraction of guinea pig right atria at an $ED_{25}$ of 5.0 mcg./ml. These activities give an absolute separation ratio of 18 which is a thirty-six-fold improvement when compared to the corresponding activity of d, l isoproterenol (absolute separation ratio—0.5) in similar in vitro preparations.

The compounds of this invention are prepared from a sequence of reactions illustrated by the following preparation of 3,4-dihydroxyphenyl-2-decahydroquinolylcarbinol:

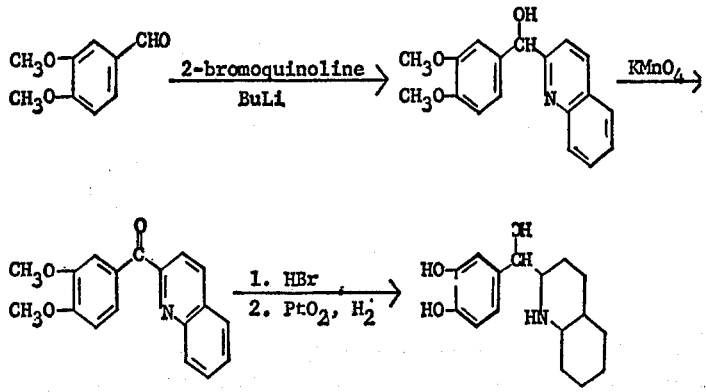

Thus, as shown above, a lower alkyl ether derivative of an appropriately substituted hydroxybenzaldehyde is condensed with a 2-haloquinoline, preferably bromo, in the presence of an organometal derivative, preferably butyl lithium, and in an organic nonreactive solvent such as tetrahydrofuran or ether to give a substituted phenyl 2-quinolylcarbinol. The latter is oxidized for example with potassium permanganate to the corresponding ketone. The ketone is demethylated with 48% hydrobromic acid and then reduced with for example platinum oxide and hydrogen to give the hydroxyphenyl - 2 - decahydroquinolylcarbinol. This results in a mixture of erythro/threo isomers present in about a 4:1 ratio. The individual isomers are obtained by fractional crystallization of the product, preferably as an acid addition salt.

Alternatively a benzyl ether derivative of an appropriately substituted hydroxybenzaldehyde is condensed as above with a 2-haloquinoline to give a substituted phenyl-2-quinolylcarbinol. The latter is reduced with platinum oxide and hydrogen to give the corresponding 2-decahydroquinolylcarbinol and then debenzylated with palladium-on-carbon and hydrogen to yield the hydroxyphenyl-2-decahydroquinolylcarbinol.

A further modification of the preparation of the compounds of this invention is the condensation of the Grignard reagent derived from a methyl ether derivative of an appropriately substituted hydroxy halobenzene, preferably bromobenzene, with 2-cyanoquinoline. The resulting ketone is demethylated and reduced as described above to give the product.

If desired the diastereoisomers of the compounds of Formula I may be separated, for example, by the following procedure. The benzyl ether derivative of an appropriately substituted hydroxybenzaldehyde is treated as described above with 2-quinolyl lithium and the resulting quinolylcarbinol as the hydrochloride is reduced catalytically to give an isomeric mixture of benzyloxyphenyl-2-decahydroquinolylcarbinol hydrochlorides from which a single hydrochloride is isolated by recrystallization. The latter is converted to its diastereoisomer by thionyl chloride conversion to the chloride (retention) followed by hydrolysis of the chloride with aqueous silver nitrate (inversion). Stereochemistry of the diastereoisomers is established by examination of the N.M.R. spectra of the corresponding benzyloxyphenyl-2 - decahydroquinolylcarbinol cyclic carbamates derived from treatment with phosgene. Debenzylation of the separated diastereoisomers as described above affords the erythro and threo products of Formula I.

The compounds of this invention may be administered orally or parenterally in conventional dosage unit forms such as tablets, capsules, injectables or the like, by incorporating the appropriate dose of a compound of Formula I, with carriers according to accepted pharmaceutical practices. Preferably a compound or an acid addition salt thereof is administered orally to an animal organism in a tablet or capsule comprising an amount sufficient to produce β-adrenergic stimulant activity. Each dosage unit will contain the active medicament in an amount of about 25 mg. to about 50 mg. Advantageously equal doses will be administered 3 to 4 times daily with the daily dosage regimen being about 75 mg. to about 200 mg.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly, the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension. Of particular applicability for intranasal administration is an aerosol dispensing system wherein the active medicament is incorporated with Freon or other inert propellant in an aerosol container. Such an aerosol system will deliver a metered dose of about 250 mcg. to about 500 cmg., administered once or twice at a time as needed. Also useful for this purpose is a liquid formulation in a plastic squeeze bottle.

The foregoing is a general description of how to prepare the compounds of this invention. The following examples illustrate the preparation of specific compounds having β-adrenergic stimulant activity. However, this should not be construed as a limitation of the invention since appropriate variations in the starting materials will produce other products set forth hereinabove.

EXAMPLE 1

A stirred solution of 56.3 ml. of 1.6 M solution of butyl lithium in hexane is cooled to −40° C. under nitrogen and 15.9 g. (0.0765 m.) of 2-bromoquinoline in 30 ml. of ether is added dropwise. The mixture is stirred 15 minutes at −40° C. and a solution of 12.7 g. (0.0765 m.) of 3,4-dimethoxybenzaldehyde in 60 ml. of ether is added. After stirring at −15° C. for 45 minutes, the mixture is poured into 150 g. ice/100 ml. concentrated hydrochloric acid. The separated aqueous layer is made alkaline with concentrated ammonium hydroxide, extracted with ether and the dried extract concentrated to give 3,4-dimethoxyphenyl-2-quinolylcarbinol as an orange gum.

A stirred suspension of 18.9 g. (0.05 m.) of the above carbinol in 300 ml. of water is heated to 70° C. and 15.2 g. (0.0963 m.) of potassium permanganate is added in portions. The mixture is stirred and heated on a steam bath for 40 minutes, cooled to 30° C. and diluted with 300 ml. of ethyl acetate. This mixture is filtered, and the organic extract is dried and concentrated to give 3,4-dimethoxyphenyl-2-quinolyl ketone, M.P. 101–103° C.

A solution of 6.9 g. of the above ketone in 200 ml. of 48% hydrobromic acid is refluxed for one and one-half hours and then concentrated in vacuo. The residue is dissolved in ethanol, toluene is added, the solution concentrated and the residue stripped with toluene to yield 3,4-dihydroxyphenyl-2-quinolyl ketone hydrobromide, M.P. 228–234° C.

The hydrobromide is triturated with 75 ml. of sodium bicarbonate solution and extracted with ethyl acetate. The product is evaporated and the residue recrystallized from acetonitrile to yield the free base having a melting point of 201–202° C.

The free base is treated with a mixture of acetone-hydrochloric acid-ether to yield the 3,4-dihydroxyphenyl-2-quinolyl ketone hydrochloride, M.P. 219–227° C.

A mixture of 0.5 g. of platinum oxide and a solution of 3.4 g. (0.0113 m.) of 3,4-dihydroxyphenyl-2-quinolyl ketone hydrochloride in 20 ml. of water and 80 ml. of ethanol is hydrogenated on the Parr apparatus using an initial hydrogen pressure of 50 p.s.i. at room temperature. The reaction mixture is filtered, the filtrate concentrated in vacuo. The residue is recrystallized from methanol-ether to give erythro-3,4-dihydroxy-phenyl-2-decahydroquinolylcarbinol hydrochloride, M.P. 216–217° C. (decomp.).

EXAMPLE 2

Condensation of 20.8 g. of 3,5-dimethoxybenzaldehyde with quinolyl lithium (from 19.8 g. of 2-bromoquinoline and 64 ml. of 1.6 M of butyl lithium in hexane) is carried out as in Example 1 to give 3,5-dimethoxyphenyl-2-quinolylcarbinol. Oxidation of the carbinol with potassium permanganate gives 3,5-dimethoxyphenyl-2-quinolyl ketone. A solution of the ketone (7.5 g.) and 65 ml. of 48% hydrobromic acid is refluxed for two hours, concentrated in vacuo and the residue crystallized to yield 3,5-dihydroxyphenyl - 2 - quinolyl ketone hydrobromide. The latter (3.8 g.) in 100 ml. of methanol is hydrogenated in a Parr apparatus at 25° C. and an initial hydrogen pressure of 60 p.s.i. in the presence of 0.9 g. of platinum oxide. The reaction mixture is filtered and the filtrate concentrated to give 3,5-dihydroxyphenyl-2-decahydroquinolylcarbinol hydrobromide.

Treatment of the hydrobromide with aqueous sodium bicarbonate followed by extraction with ethyl acetate yields the free base of the carbinol which may be reacted with other acids as described hereinabove to give other acid addition salts.

EXAMPLE 3

To a stirred solution of 25 g. (0.134 m.) of 2-chloroisovanillin in 80 ml. of methylene chloride at 0° C. is added dropwise 19 ml. (0.2 m.) of boron tribromide and the mixture is stirred at 25° C. for three hours. Methanol (100 ml.) is added and the solution is concentrated to give 2-chloroprotocatechulaldehyde, M.P. 193-195° C.

The above catechulaldehyde (15.2 g.), 24 g. of potassium carbonate and 1.0 g. of sodium iodide in 300 ml. of ethanol is treated, by dropwise addition, with a solution of 22 g. of benzyl chloride in 70 ml. of ethanol. The mixture is stirred and refluxed for 17 hours, concentrated and diluted with water to give 2-chloro-3,4-dibenzyloxybenzaldehyde.

Condensation of 6.65 g. (0.0189 m.) of the above aldehyde with quinolyl lithium (from 3.0 g. of 2-bromoquinoline and 9.8 ml. of 1.6 M butyl lithium in hexane) yields 2-chloro-3,4-dibenzyloxyphenyl-2-quinolylcarbinol.

A mixture of 2.85 g. (0.0006 m.) of the above hydrochloride, 0.7 g. of platinum oxide and 100 ml. of methanol is hydrogenated at 25° C. and on initial hydrogen pressure of 60 p.s.i. on a Parr apparatus. After 45 minutes the reaction mixture is filtered, the filtrate concentrated and the residue crystallized to give 2-chloro-3,4-dibenzyloxyphenyl - 2 - decahydroquinolylcarbinol hydrochloride.

The above dibenzyloxy derivative (2.3 g.) with 0.6 g. of 10% palladium-on-carbon in 100 ml. of methanol is hydrogenated on a Parr apparatus at 25° C. and 60 p.s.i. initial hydrogen pressure. After 30 minutes the reaction mixture is filtered, the filtrate concentrated and the residue triturated with acetone to give 2-chloro-3,4-dihydroxyphenyl-2-decahydroquinolylcarbinol hydrochloride.

EXAMPLE 4

Following the procedure of Example 1, a solution of 10.9 g. (0.0523 m.) of 2-bromoquinoline in 45 ml. of ether is added dropwise to a stirred solution of 40 ml. of 1.6 M butyl lithium in hexane cooled to —40° C. A solution of 9.42 g. (0.0523 m.) of 2-methyl-3,4-dimethoxybenzaldehyde in 45 ml. of ether is added. After stirring at —15° C. for 45 minutes, the reaction mixture is poured into ice/concentrated hydrochloric acid to yield after similar workup 3,4-dimethoxy-2-methylphenyl-2-quinolylcarbinol. Oxidation of the carbinol, 7.3 g. (0.0282 m.), with 1.5 equivalents of potassium permanganate in 85 ml. of water gives 3,4-dimethoxy-2-methylphenyl-2-quinolyl ketone.

A solution of 5 g. (0.0194 m.) of the ketone in 50 ml. of 48% hydrobromic acid is refluxed with stirring for one and one-half hours, evaporated in vacuo and the residue crystallized to give 4-hydroxy-3-methoxy-2-methylphenyl-2-quinolyl ketone hydrobromide. The latter (2.67 g.) is refluxed in 100 ml. of 48% hydrobromic acid for two hours and similarly worked up to furnish the 3,4-dihydroxy-2-methylphenyl-2-quinolyl ketone hydrobromide.

To a solution of 2.2 g. (0.0071 m.) of 3,4-dihydroxy-2-methylphenyl-2-quinolyl ketone hydrobromide in 20 ml. of water and 80 ml. of methanol is added 0.3 g. of platinum oxide. The mixture is hydrogenated on the Parr apparatus using an initial hydrogen pressure of 60 p.s.i. at 25° C. Hydrogen uptake is complete in about 15 minutes and the reaction mixture is filtered. The filtrate is treated with sulfur dioxide, concentrated in vacuo and the residue crystallized to yield 3,4-dihydroxy-2-methylphenyl-2-decahydroquinolylcarbinol hydrobromide. The hydrobromide (0.8 g.) in about 5 ml. of water is neutralized with potassium carbonate. The free base thus obtained is suspended in methanol and ethereal hydrogen chloride is added to give the corresponding 3,4-dihydroxy-2 - methylphenyl - 2 - decahydroquinolycarbinol hydrochloride.

What is claimed is:

1. A pharmaceutical composition having β-adrenergic stimulant activity in dosage unit form comprising a pharmaceutical carrier and from about 250 mcg. to about 50 mg. of a chemical compound of the formula:

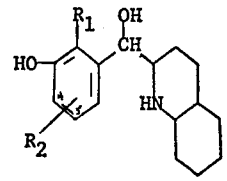

or a pharmaceutically acceptable acid addition salt of said compound wherein:

R₁ is hydrogen, methyl or chlorine; and
R₂ is hydroxy in the 4 or 5 position.

2. The method of producing β-adrenergic stimulant activity which comprises administering internally to animals requiring bronchodilation an amount sufficient to produce said activity a chemical compound of the formula:

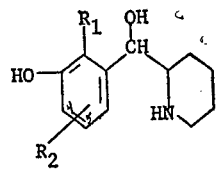

or a pharmaceutically acceptable acid addition salt of said compound wherein:

R₁ is hydrogen, methyl or chlorine; and
R₂ is hydroxy in the 4 or 5 position.

References Cited
UNITED STATES PATENTS
3,438,989   4/1969   Shavel _____ 260—289 R STANLEY J. FRIEDMAN, Examiner

PO-1050
(5/69)

UNITED STATES PATENT OFFICE
CERTIFICATE OF CORRECTION

Patent No. 3,773,954                    Dated November 20, 1973

Inventor(s) Carl Kaiser

It is certified that error appears in the above-identified patent and that said Letters Patent are hereby corrected as shown below:

Column 6, Claim 2, lines 40 through 48, change the formula from:

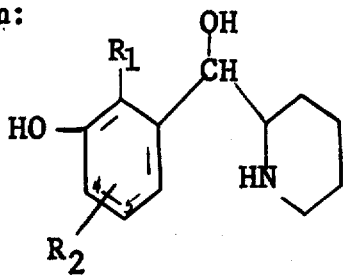

to read:

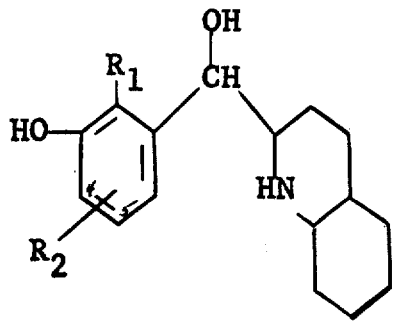

Signed and sealed this 14th day of May 1974.

(SEAL)
Attest:

EDWARD M.FLETCHER,JR.
Attesting Officer

C. MARSHALL DANN
Commissioner of Patents